United States Patent [19]

Ishii

[11] 4,408,099
[45] Oct. 4, 1983

[54] RADIO PAGING SYSTEM CAPABLE OF ACCEPTING MESSAGE WITH ACCESS OF PAGING RECEIVER

[75] Inventor: Daisuke Ishii, Tokyo, Japan

[73] Assignee: Nippon Electric Co., Ltd., Tokyo, Japan

[21] Appl. No.: 270,992

[22] Filed: Jun. 5, 1981

[30] Foreign Application Priority Data

Jun. 13, 1980 [JP] Japan ................................ 55-80025

[51] Int. Cl.³ .......................................... H04M 11/00
[52] U.S. Cl. ............................................. 179/2 EC
[58] Field of Search ................. 179/2 E, 2 EA, 2 EB, 179/2 EC, 18 BF, 2 A, 2 AM, 2 C, 2 DP; 455/31, 38; 340/311, 312

[56] References Cited

U.S. PATENT DOCUMENTS 3,836,726 9/1974 Wells et al. ....................... 179/2 EC
4,194,153 3/1980 Masaki et al. ........................ 455/343
4,263,480 4/1981 Levine .............................. 179/2 EC

FOREIGN PATENT DOCUMENTS 2024567 1/1980 United Kingdom ............. 179/2 EC

Primary Examiner—G. Z. Rubinson
Assistant Examiner—W. J. Brady
Attorney, Agent, or Firm—Laff, Whitesel, Conte & Saret

[57] ABSTRACT

A radio paging system calls a paged receiver from a first telephone, with signals sent by way of a paging terminal. Paging is carried out by the steps of (a) sending a paging signal assigned to the paging receiver and a message from the first telephone set to the paging terminal; (b) transmitting the paging signal from the paging terminal to the paging receiver via a radio frequency; (c) storing the message at the paging terminal; (d) at the paging receiver, receiving the paging signal transmitted by the step (b); (e) storing in advance the paging number for the paging receiver at the paging receiver; (f) sending tones from the paging receiver corresponding to the paging number stored by the step (e), the tones being sent to the paging terminal by way of a second telephone; and (g) sending the message stored by the step (c) to the second telephone, in response to the tones.

10 Claims, 20 Drawing Figures

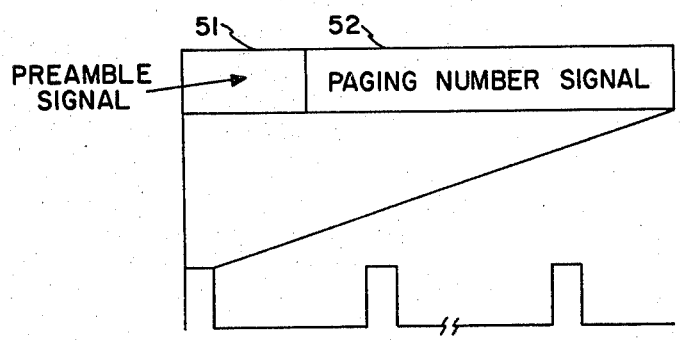
FIG. 9A
FIG. 9B
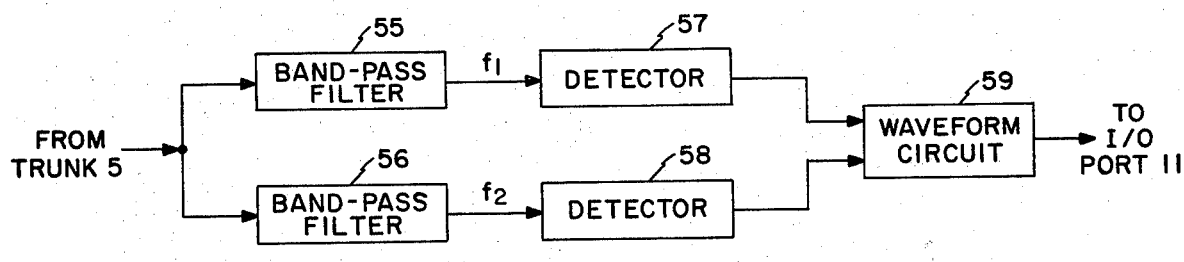
FIG. 10
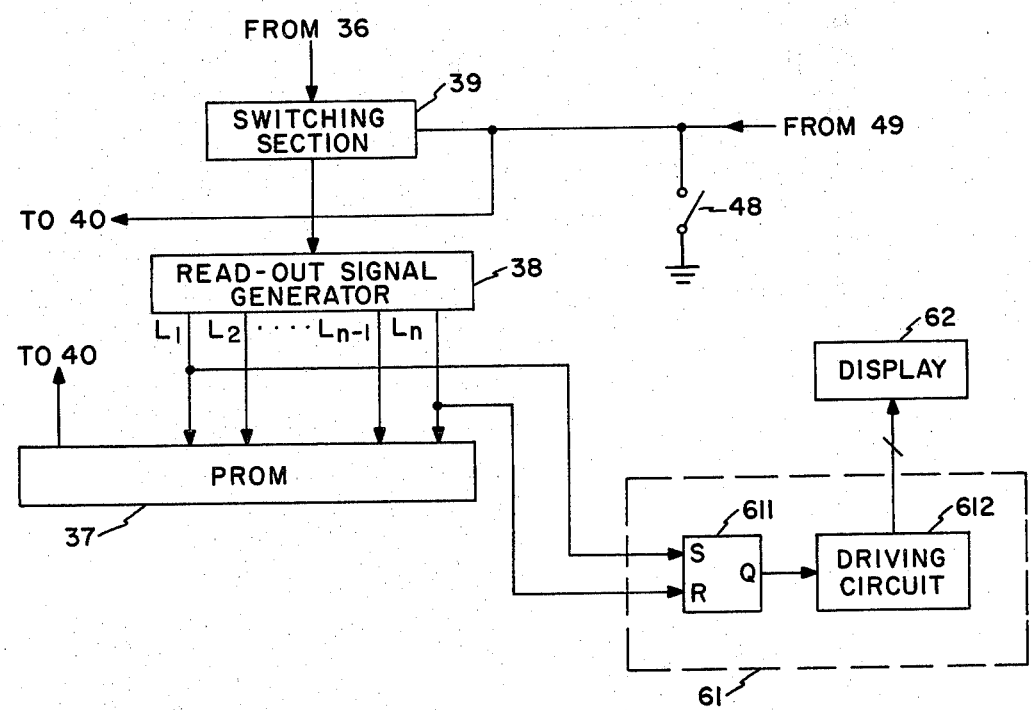
FIG. 11

RADIO PAGING SYSTEM CAPABLE OF ACCEPTING MESSAGE WITH ACCESS OF PAGING RECEIVER

BACKGROUND OF THE INVENTION

The present invention relates to a radio paging system and, more particularly to a radio paging system in which a called pager holder is not only alerted but is also supplied with an audible or other message, such as a telephone number, which he is expected to call back.

One example of conventional systems adapted to transmit such "an" additional message is the so-called "Answering Service System". In this system, the telephone exchange office, to which the calling subscriber is connected is adapted to store his message which is to be conveyed to the person who is carrying a paging receiver, while transmitting the paging signal through a radio frequency channel. Upon recognition of his page, as signalled by an alert tone or vibration, the paged party dials a predetermined answering code or telephone number, at a telephone set, to get an access to the stored message.

Another example of a conventional system is known in Japan as a "Super-Bell System", in which the calling party's phone number is stored at the telephone office, in place of the message that is stored in the Answering Service System. When alerted by the paging tone, the paged party dials a predetermined number plus the called party's pager-identification number. In response, the telephone exchange office utilizes the stored number to establish a connection between the paged party and the calling party. This system permits a calling party to place a paging signal through any telephone set which may be located anywhere. This is in clear contrast to the conventional paging system, in which the paged party's calling back is achieved only through the calling party's designated number.

The Answering Service System has a disadvantage in that a third party knowing the predetermined page answering number can get an access to the caller's message stored at the telephone exchange office. Furthermore, the system must assign separate numbers for the pager identification and for the message readout, thus complicating the system as a whole.

Similar problems are involved also in the Super-Bell System, such as the establishment of an undesired connection between a calling party and the third party, who knows the predetermined number. Furthermore, such illicit third party's call makes the desired telephone contact impossible, because the stored calling party's number is erased from the storage once it is read out.

SUMMARY OF THE INVENTION

An object of the present invention, therefore, is to provide a radio paging system of high reliability and simpler construction in which a paged party can obtain a caller's message with an access of the pager receiver.

According to one feature of the present invention, there is provided with a radio paging system for calling a paging receiver from a first telephone set by way of a paging terminal. The method of making this call comprises the steps of (a) sending a paging signal assigned to the paging receiver and a message from the first telephone set to the paging terminal; (b) transmitting the paging signal from the paging terminal to the paging receiver over a radio frequency; (c) storing the message at the paging terminal; (d) receiving, at the paging receiver, the paging signal transmitted in the step (b); (e) storing in advance the paging number for the paging receiver at the paging receiver; (f) sending tones corresponding to the paging number stored in the step (e) from the paging receiver to the paging terminal by way of a second telephone set; and (g) sending the message stored in the step (c) to the second telephone set in response to the tones.

BRIEF DESCRIPTION OF DRAWINGS

Other features and advantages of the present invention will be more apparent from the detailed description hereunder taken in conjunction with the accompanying drawings, wherein:

FIGS. 9A and 9B show one example of a signal composition which is sent from the paging receiver;

FIG. 10 is a block diagram of one embodiment of the tone receiver at a paging terminal; and FIG. 11 is a modified block diagram illustrating the attachment of a visual display function to the receiver of FIG. 5.

To facilitate an understanding of the description of the operation of the system illustrated in FIG. 1, the step numbers in the flow charts of FIGS. 2A and 2B will be given parenthesized after references to the respectively corresponding steps.

Figure 1:
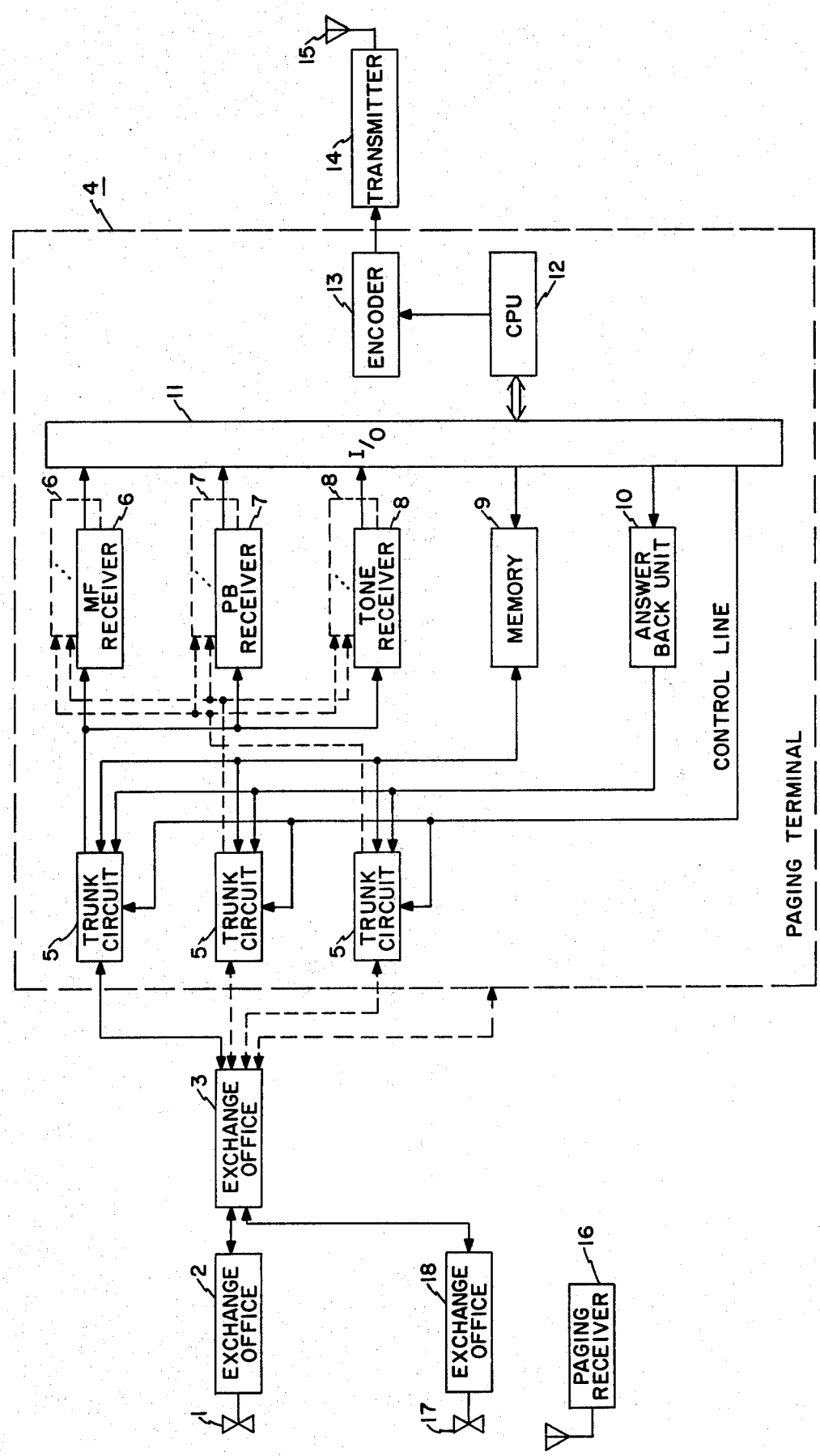
FIG. 1 is a block diagram illustrating one embodiment of the configuration of a radio paging system according to the present invention.
Figure 2A:
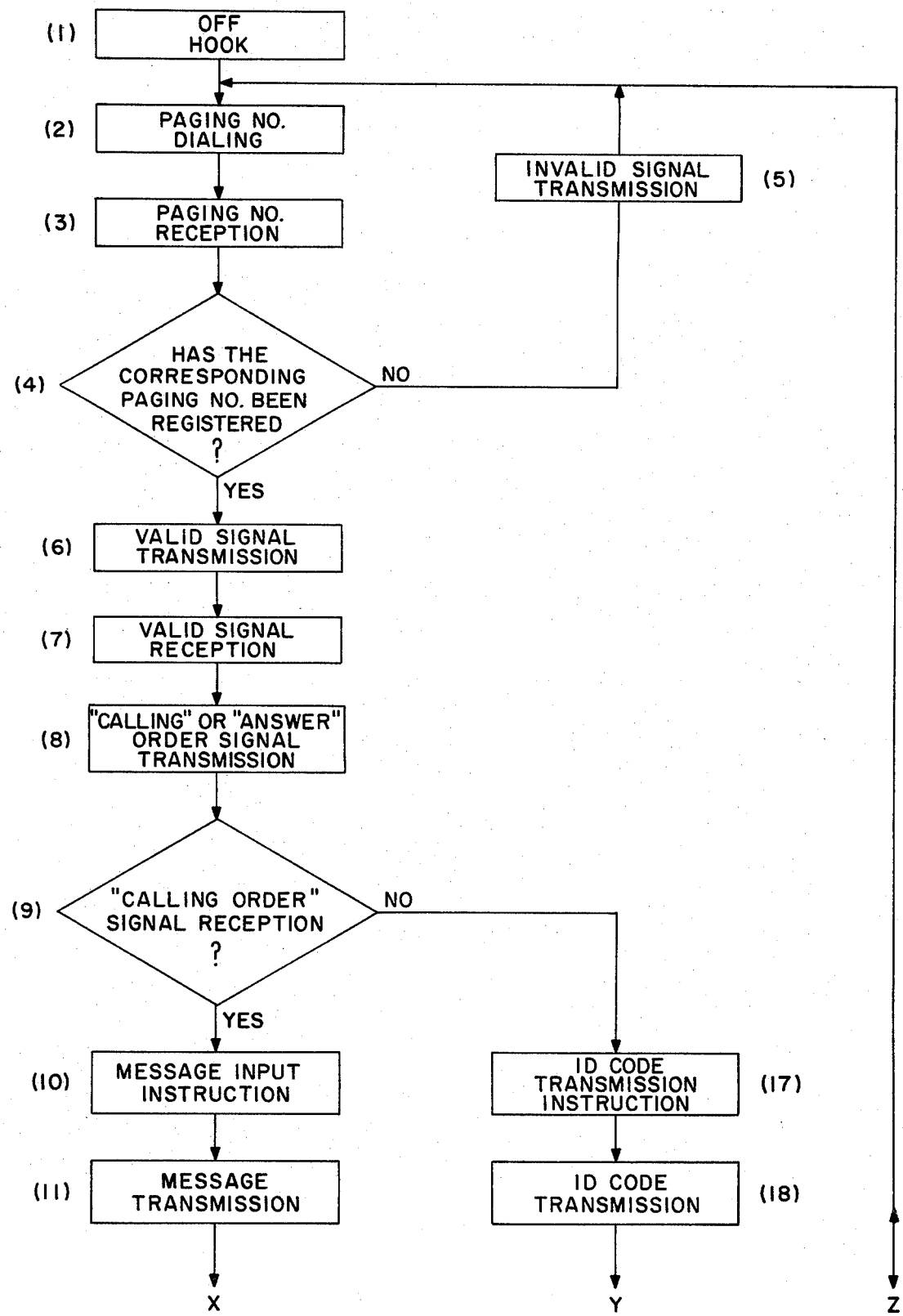
FIGS. 2A and 2B are flow charts for describing the system of FIG. 1.

A person (the caller) wishing to contact a person (or recipient) holding a paging receiver 16, (FIG. 1) dials the paging number of the receiver 16, the dialing being from a telephone set 1 (Steps 1 and 2 in FIG. 2A). This dialled number signal is sent by way of an ordinary telephone exchange office 2 to a paging service telephone exchange office 3. There it is further transferred by way of an unoccupied truck circuit (a trunk circuit 5, for instance) to an unoccupied multifrequency (MF) receiver (a receiver 6, for instance) in a paging terminal 4 which is responsible for the processing of calls or paging numbers. A paging number from the multifrequency receiver 6 is received through an input/output (I/O) port 11 by a central processing unit (CPU) 12. There it is checked to determine whether or not the paging number is registered. If it is registered, the CPU 12 actuates an answer-back unit 10 to transmit a registration-valid signal to the caller (Steps 3~6).

After confirming the registration-valid signal, the caller uses pushbuttons or the like on the telephone set 1, to enter an input signal to the effect that his dialling is for "calling" a paging receiver (Steps 7 and 8). A tone representing the "calling" order signal, which is generated by the pushbutton operation, reaches the paging terminal 4 via a route which is the same route that is used for a dialled number. The tone signal is received and detected by a pushbutton (PB) tone receiver 7 therein, and supplied to the CPU 12 by way of the I/O port 11.

Upon confirming the receipt of this pushbutton tone, the CPU 12 actuates the answer-back unit 10 to generate a message input instruction which informs the caller that he may now enter his message (Steps 9 and 10). As it is entered by the caller, the message is stored in a memory section 9 in the paging terminal 4 (Steps 11 and 12). The paging terminal 4 is informed of the completion of the storing of the message either by the caller appropriately operating the pushbuttons or another such means, or by a timer within the paging terminal 4 itself.

Upon completion of the storing of the message, the CPU 12 informs the caller in order to finish its accepting action. The caller hangs up his telephone set 1 (Step 13). The message from the caller may be either his telephone number or any other audible message. The telephone number can be entered either by a pushbutton operation or by a speech recognition device. Or, if there is a system permitting the caller's telephone number to be sent to the recipient through the switching network, as by the so-called multifrequency code signalling (MFC) system, its number can be employed as well.

Next, the CPU 12 sends the earlier accepted paging number to an encoder 13 (for example), the encoder may be a type $\mu$PD8085A device manufactured and marketed by the assignee, NEC. There the paging number is encoded into a signal form which is receivable by the receiver 16 and is fed to a transmitter 14. The transmitter 14 modulates a carrier wave with the encoded signal. After power-amplifying, the modulated signal is radiated from a transmission antenna 15 over a radio frequency as a paging signal (Step 14). If, at this time, the recipient receiver 16 is present within the service area, the transmitted paging system will be received by the receiver 16, which informs the recipient of his being paged (Step 15). The recipient at receiver 16 dials his own paging number on a nearby telephone set 17 to confirm the content of the message with the paging terminal 4 (Steps, 16, 1 and 2). Although he is the paged caller who is responding from the telephone set 17, he will be referred to as the "recipient" in this context in order to distinguish him from the original caller who placed the page from the telephone set 1.

The number dialled by the recipient from the telephone set 17 is sent to the paging terminal 4 by way of telephone exchange offices 18 and 3. As in the case of the call from the telephone set 1, if the dialled number is stored in a register, the CPU 12 will send back from the answer-back unit 10 a registration-valid signal, the signal being sent to the telephone set 17 (Steps 3~6). After confirming the valid signal as it is received from the paging terminal 4, the recipient presses an "answer" pushbutton on 17. The recipient thus enters, by pressing pushbuttons on the telephone set 17, the information that his dialling is for an "answer" to the page (Steps 7 and 8).

Upon confirmation of the "answer" order signal, the CPU 12 sends to the recipient a signal which instructs him to transmit his identification (ID) code (Steps 9 and 17). The recipient, by means of the receiver 16, transmits his ID code in a tone form from the telephone set 17 (Step 18). (The transmission of this tone will be described hereinafter in detail). The tone representing the ID code is received by a tone receiver 8 and fed to the CPU 12. Upon receiving the ID code which is so transmitted, the CPU informs the recipient that the ID code is correct, if it is, and at the same time reproduces and transmits the message stored in the memory section 9 (Steps 19 and 20). After receiving the message, the recipient hangs up the telephone set 17 to complete the whole process (Steps 21 and 24).

Figure 2B:
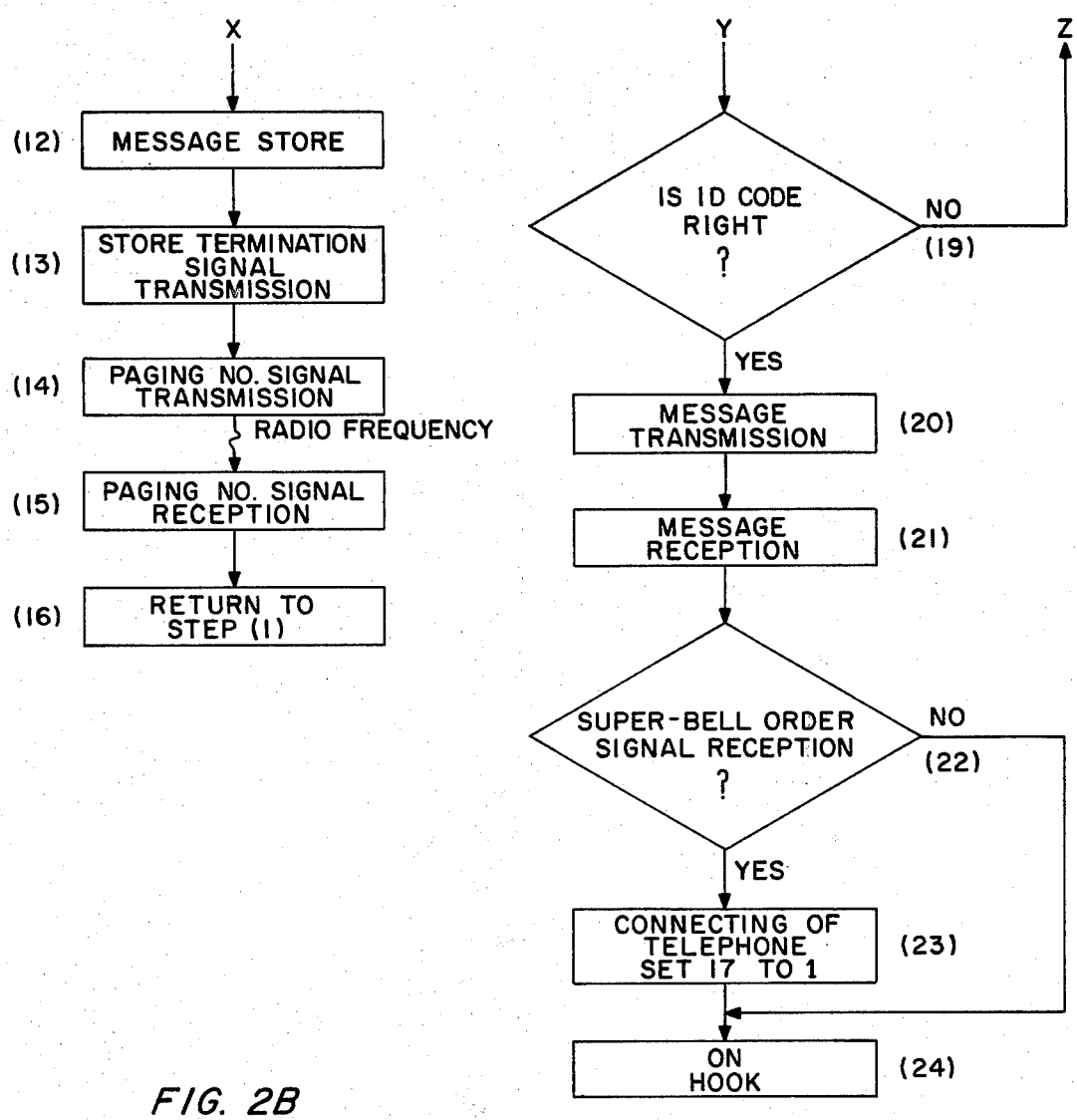

Incidentally, to provide the system illustrated in FIG. 1 with the Super-Bell function, referred to above, the arrangement can be modified so that, after receiving the message of Step 21 of the flow charted in FIG. 2B, the recipient can enter with pushbuttons the information that he desires to complete the connection of a Super-Bell. The CPU 12, in response to this input, can connect the two telephone sets by joining the trunk circuit 5 of the telephone set 17 with the trunk circuit 5 which is to be linked to the telephone set 1 (Steps 22 and 23). After the dial connection (Step 7 in FIG. 2A), a distinction between a "calling" to the receiver 16 and an "answer" from the recipient is entered by a pushbutton operation, as described in the foregoing description. However, this confirmation with pushbuttons can be dispensed with if a special number, exclusive for the "answer" use, is assigned to the paging terminal 4, this special number being separate from the paging number of the receiver 16.

Figure 3:
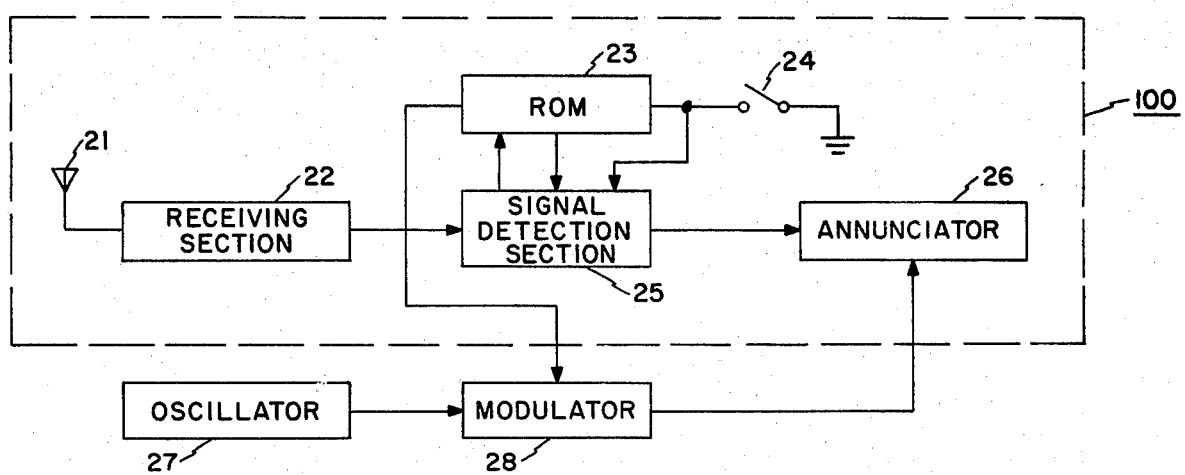
FIG. 3 is a block diagram illustrating one embodiment of the paging receiver according to the present invention.

FIG. 3 is a block diagram illustrating one embodiment, according to the present invention, of the paging receiver 16, referred to in FIG. 1. A paging signal is sent from the paging terminal 4 (FIG. 1) and is received by an antenna 21. After being demodulated by a receiving section 22, that signal is supplied to a signal detection section 25. In response to the output of the receiving section 22, the signal detection section 25 reads out the paging number stored in advance in a read only memory (ROM) 23 and compares the demodulated paging number with the paging number read out of the ROM 23. If the compared numbers are identical with each other signal detection section 25, will give an identity signal. An annunciator 26 informs the recipient that he is being paged by generating an audible sound in response to the identity signal. A section 100 may comprise circuits, such as those disclosed in U.S. Pat. No. 4,127,846 issued to Mori et al. on Nov. 28, 1978 or U.S. Pat. No. 4,194,153 issued to Masaki et al. on Mar. 18, 1980.

Recognizing the call, the recipient uses a nearby telephone set to form the paging terminal that he is answering a paging call (Step 8 in FIG. 2A). Then he transmits the ID code number in a tone form in the following manner. An external switching section 24 is operated to block the output of the signal detection section 25, and at the same time the ROM 23 is actuated to supply the paging number signal of the receiver to a modulator 28. The modulator 28 modulates the paging number signal from the ROM 23 on to a carrier signal from an oscillator 27, thereby generating signals of a frequency (usually 300 Hz~3 KHz) that can pass over a telephone line. Finally, this modulated signal is supplied to the annunciator 26, where the signal is converted into a tone, to be emitted.

Figure 4A:
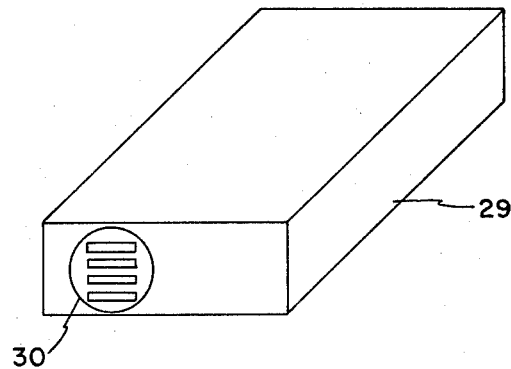
FIGS. 4A and 4B respectively show a perspective view and the access state of the paging receive to a mouthpiece according to the present invention.
Figure 4B:
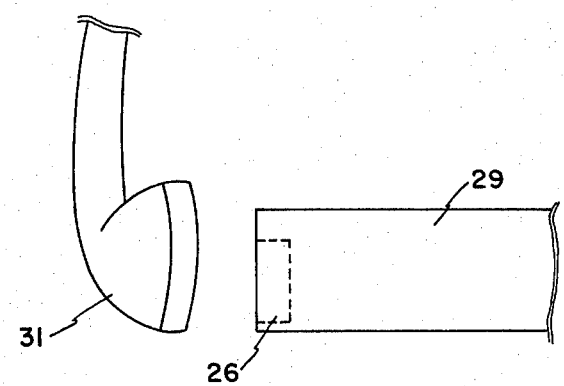

FIG. 4A shows a perspective view of a paging receiver according to the present invention, and FIG. 4B illustrates how this receiver is used to access a telephone set. By bringing the annunciator-equipped face 30 of a housing 29 and the mouthpiece 31 of the telephone set close to each other, the annunciator 26 and the mouthpiece 31 are acoustically joined, so that a tone from the annunciator enters into the mouthpiece 31. The tone supplied to the telephone set mouthpiece, as described with reference to FIG. 1, is received by the tone receiver 8 (FIG. 1) via the exchange offices 18 and 3, and any one of the trunks 5, and is transferred to the CPU 12.

Next will be described in details the paging receiver 16 according to the present invention with reference to FIG. 5. A carrier wave is modulated in the station of FIG. 1 with the paging signal and transmitted from the transmitter 14 of a paging terminal, to an antenna 34 (FIG. 5) of a receiving section 35, where it is demodulated. In this instance, it is supposed that the paging signal comprises a preamble signal followed by a paging number signal. For further details on this signal form, reference is made to the Masaki et al. U.S. Pat. No. 4,194,153 described above. The demodulated signal from the receiving section 35 is led to a signal detecting section 36 in which a preamble signal detector 361 produces an actuating signal, if it detects the preamble signal of the paging signal. The preamble signal detector 361, achieves the frame synchronization, and supplies the actuating signal by way of an AND gate 391 and an OR gate 392 of a switching section 39 to a shift register 381 in a read-out signal generator section 38, for reading out the content of a memory section 37 (for instance, a programmable read-only memory: PROM) where the paging number of the receiver is stored.

The paging number stored in the PROM 37 and read out by the shift register 381 is led by way of an AND gate 402 of another switching section 40 to a paging number signal detector 362 in the signal detecting section 36. The detector 362 compares the paging number digital signal read out of memory 37 with the output of the receiving section 35, i.e. the paging number of the called party. If the two numbers are identical with each other, detector 362 generates an identity signal, which is supplied to a frequency divider (or multiplier) 363. The divider 363, is composed, for instance, of a combination of flipflops or the like. Circuit 363 is actuated in response to the identity signal and to a clock recovery circuit 47, to generate a sequence of pulses having a desired cycle of repeated pulses, such as the pulses shown in FIG. 6A, for example. The pulses (FIG. 6A) are supplied to a modulator section 41 (FIG. 5).

Figure 6A:
FIGS. 6A-6C and 7A-7E show an example of waveforms used in generating modulated tones in FIG. 5.
Figure 6B:
Figure 6C:

In the modulator section 41, a signal from an audible tone oscillator section 42, such as the tone signal shown in FIG. 6B, is modulated with the pulses from divider 363. Modulation occurs in an AND gate 411 to provide a signal, as shown in FIG. 6C, which is supplied as output of the modulator section 41 by way of an OR gate 412. The output tone signal from the modulator section 41 is amplified by an amplifier 43, and then is emitted from an annunciator 44 as a tone (an audible sound), which lets the recipient know that he is being paged. For further details on the operation to receive the paging signal, reference is made to the Masaki et al Patent described above.

The audible tone oscillator 42 provides an audible frequency signal by frequency-dividing (or frequency-multiplying) the oscillation output from an oscillation section 45, which has a fixed oscillation frequency responsive to the driving of an oscillating element 46, which should be either a crystal or ceramic oscillator that is stable in oscillating operation, even under fluctuating voltage and/or temperature. The output of the oscillation section 45 is also supplied to the clock recovery circuit 47, where synchronization clock pulses are recovered from the paging signal to achieve a synchronization between the signal detecting section 36 and the read-out signal generator section 38.

Hereunder will be described the operation to transmit the tone representing the paging number of the receiver from the recipient station to the paging terminal. In FIG. 5, the logic level "1" of a point M, is supplied from a battery 50 by way of a switch 49. The logic level is switched to a logic level "0" by grounding the point M with an external switch 48. This action blocks the actuating signal from the preamble signal detector 361 to the shift register 381. At the same time, an inverter 393 supplies the shift register 381 with another actuating signal having a logic level of "1", in place of the output of the detector 361.

Meanwhile a paging number digital signal is sent from the PROM 37 to the paging number signal detector 362 and then is directly supplied to the modulator section 41. Moreover the point M is connected to the switching section 40 (including AND gates 401 and 402 and an inverter 403) and to the modulator section 41 (including AND gates 411 and 414, an OR gate 412 and an inverter 413). The modulation input signal, which is supplied to the modulator section 41, from the signal detecting section 36, can be the paging number digital signal which is provided from the PROM 37 via the switching section 40. Further, to vary the read-out rate of the PROM 37, the signal from the switch 48 is also supplied to a clock rate switching circuit 382 of the read-out signal generator section 38. The clock rate switching circuit 382 can comprises, for instance, two flipflops and a transistor switch. The reason why the read-out rate of this PROM 37 is varied, will be explained later.

Figure 7A:
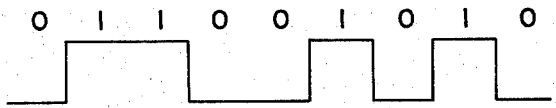
Figure 7B:

The read-out signal generator section 38 is actuated by the external switch 48, to read out of the PROM 37 a paging number digital signal corresponding to the paging number of the receiver. This paging number digital signal, is a signal such as shown in FIG. 7A. It entered by way of the switching section 40 into the modulator section 41, which modulates the output of the audible tone oscillator section 42, with this input digital signal. The output of the audible tone oscillator 42 is a signal of a continuous frequency f1 as shown in FIG. 7B, i.e., a tone signal, which is modulated with a signal (such as shown in FIG. 7A) into that shown in FIG. 7C. According to FIG. 7C, the modulated signal of the frequency f1 occures when the output of the PROM 37 (FIG. 7A) is logic "1"; However, the modulated signal may as well occur when it is logic "0". The tone signal, so modulated, passes through the amplifier 43, and is emitted from the annunciator 44, as an audible tone. The annunciator 44, if it is structured and installed as illustrated in FIGS. 4A and 4B, can transmit the paging number of the receiver to the paging terminal in a tone form when the annunciator-equipped face of the housing and the mouthpiece of the telephone set are brought together.

Figure 8:
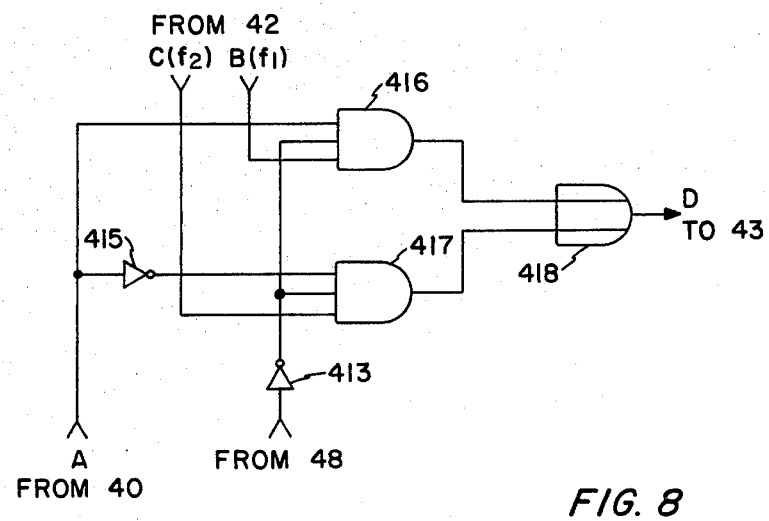
FIG. 8 shows a modified circuit for the modulator section 41 in FIG. 5.
Figure 7C:
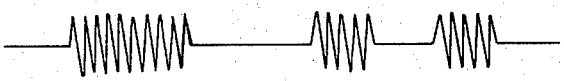
Figure 7D:
Figure 7E:
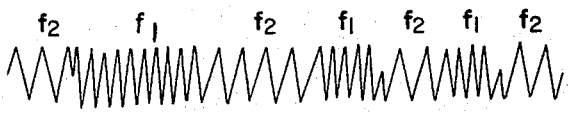

In addition to the foregoing described signaling system shown in FIGS. 7A–7C, the FSK (frequency shift keying) signaling system may also be used, in which the audible tone oscillator 42 supplies tone signals having two frequencies f1 and f2, respectively, corresponding to binary signals "1" and "0". FIG. 8 illustrates an embodiment of the modulator section (for box 41, FIG. 5) for realizing this FSK system, wherein an inverter 415, AND gates 416 and 417, and an OR gate 418 are used in place of the inverter 413 and the AND gate 414 of the demodulator section shown in FIG. 5. When an output signal (FIG. 7A), taken from the PROM 37, is fed to a terminal A (FIG. 8) and tone signals (FIGS. 7B and 7D) having the frequencies f1 and f2 from the audible tone oscillator 42 (FIG. 5) are supplied to terminals B and C, a terminal D will give the tone signal of the frequency f1, if the input to the terminal A is logic "1", or the tone signal will be the frequency f2 if the input is logic "0". The FSK signal which is so obtained will be as illustrated in FIG. 7E. The tone signals of the frequencies f1 and f2 can be readily obtained by composing the audible tone oscillator 42, for instance, by a frequency divider comprising several stages flip flops connected in series and by tapping one of its intermediate stages for an output signal.

The tone transmission from the recipient is not necessarily limited to a single transmission. If the switching section 39 (FIG. 5) is provided with a timing circuit 394, so that the content of the PROM 37 be read plural many times in response to the action of the external switch 48, the tone can be transmitted more than once to correspondingly improve the reception reliability on the part of the paging terminal. This repeated transmission is shown in FIGS. 9A and 9B, in which each transmission signal comprises the preamble signal 51 and the paging number signal 52.

When the tone signal is to be transmitted more than once, the read-out signal intervals of the read-out signal generator section 38 (FIG. 5) may or may not differ, in terms of the length of time per bit. The read out intervals of the generator section 38 depends upon whether the modulator section 41 is actuated by the receiving i.e., by the signal detection section 36, or by an external switching signal. The tone receiver 8 of the paging terminal 4, illustrated in FIG. 1, is similar to the MF receiver 6, and comprises a band-pass filter and a detector for converting a tone signal into a direct current. FIG. 10 is a block diagram illustrating one embodiment of this tone receiver, for use when the recipient transmits an FSK signal as shown in FIG. 7E. It comprises a pair of band-pass filters 55 and 56 respectively having center frequencies equal to the two frequencies of the FSK signal, detectors 57 and 58 for converting the output tone signals of the filters 55 and 56 into D.C. components, and a waveform shaping section 59 for comparing the output voltages of the detectors 57 and 58 to provide a signal, as shown in FIG. 7A. Narrowing the pass bandwidths of the band-pass filters 55 and 56 and thereby increasing their filtering performances would result in prolonging their response times and in the need for a correspondingly longer time period, per bit, for the tone transmission from the recipient. Therefore, the time required, per bit, for the tone transmitted from the recipient has to be varied according to the response speeds of the band-pass filters 55,56 of the tone receiver 8 which are provided at the paging terminal 4. This is a reason why the read-out signal generator section 38 (FIG. 5) is provided with a clock rate switching circuit 382. The band widths of filters at the paging terminal can be sufficiently narrowed if the time per bit is set as desired and if a highly stable oscillating element is used as the signal source of the paging receiving. Therefore, noise can be suppressed to an acceptably low level.

Apart from the reception reliability of the paging terminal (FIG. 1), the reliability of the paging receiver (FIG. 5) also deserves consideration. As one of the systems which is available for the transmission of signals from the paging terminal, there is a digital paging system by which the radio frequency transmitted from the transmitter is modulated with digital paging signals "1" and "0", as disclosed in the Masaki et al. U.S. Pat. No. 4,194,153 referred to above. Paging signals used in this system are susceptible to a marked deterioration in reliability, due to the fading and noise in a radio propagation path. To eliminate this disadvantage, codes with error detecting or error correcting functions, such as the Hamming code or the BCH code, are used as paging number codes. Such codes are composed of check bits which are added to the information bits in the paging digital signal.

The check bits are transmitted and received in the following manner. An encoder at the paging terminal converts a paging number assigned to the paging receiver into a code in which the check bits are added to the information bits, which is then transmitted to the paging receiver. The memory section of the paging receiver stores its own paging number either in a form where check bits are added to information bits or in an information bit form. If the paging number is stored in the memory section in the form in which check bits are added to information bits, when the recipient responds to a call from the paging terminal, its ID code signal consists of information bits and check bits which are added to them as they are directly transmitted, by the operation of the external switching section 48 as referred to in FIG. 5, from the annunciator 44 to the paging terminal. At the paging terminal, the CPU 12 (FIG. 1) corrects errors in the ID code with the check bits and thereby corrects defects in the ID code. These functions, together with a filter in the tone receiver 8, can substantially eliminate errors in codes which are attributable to the ambient noise infiltrating through the acoustic couple between the annunciator of the receiver and the mouthpiece of the telephone set or to the noise occurring on the telephone line.

Where only information bits are stored in the memory section of the paging receiver, the signal detecting section is provided with a calculating circuit for figuring out check bits from information bits. Signals obtained from this calculating circuit can afford the same effect as the afore-mentioned system in which information bits and check bits are stored in the memory section.

Erroneous reception may be due to noise or the like. In addition, erroneous reception can also arise from a mishandling by the recipient, which mishandling can be effectively prevented by the following method. When the recipient operates the external switching section of his receiver, to transmit its number to the paging terminal, the fact that the signal is being transmitted is indicated on a display unit on a part of the exterior of the receiver housing.

Figure 5:
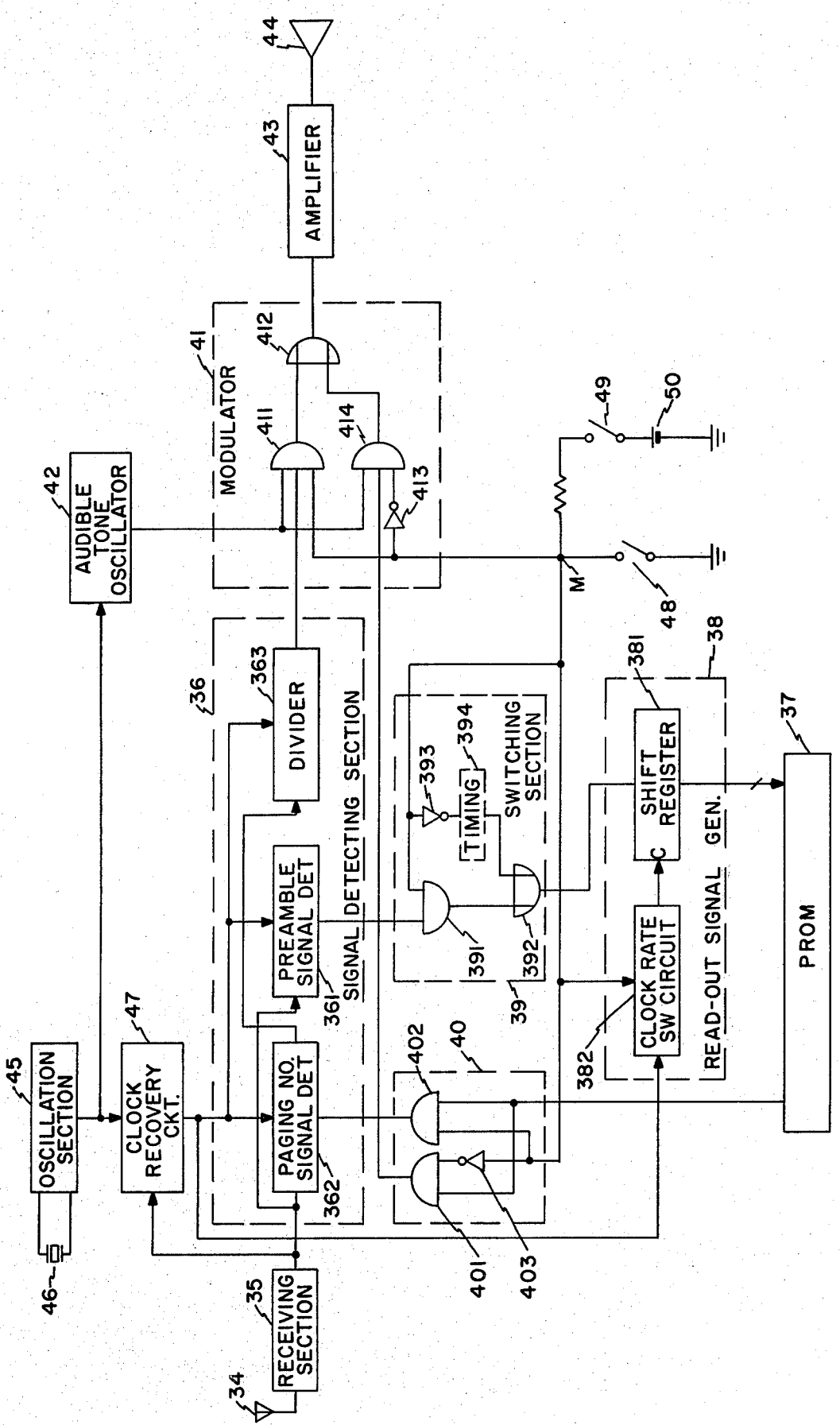
FIG. 5 is a block diagram of another embodiment of the paging receiver according to the present invention.

FIG. 11 illustrates one embodiment of this method, which can be realized by adding such a circuit to the receiver of FIG. 5. Thus, the modification of FIG. 5 comprises a display unit 62 (FIG. 11) and a display driving section 61 which includes a driving circuit 612 and an RS flipflop 611, having a set and a reset terminal respectively which receive the read-out signals appearing on lines $L_1$ and $L_n$.

The read-out signal generator 38 provides the read-out signals to the PROM 37, in the line order $L_1$-$L_n$. The signals appearing on lines $L_1$ and $L_n$ are respectively the start and the finish signals of the read-out. Therefore, the display unit 62 turns on during the period while the tone representing the ID code is being transmitted. The display unit 62 can comprise, for instance, an LED (a light emitting diode), an LCD (a liquid crystal display) or an ECD (electro-chromic display). This arrangement can make it known to the recipient that the receiver is sending out its paging number and thereby prevent the recipient from erroneously mishandling the receiver.

The hitherto described paging receiver, for use in the system of the present invention, as illustrated in FIG. 3 or FIG. 5, is highly economical because it can share a large majority of parts with a conventional receiver, with the addition of only a limited number of circuit components including an external switching section. This feature also contributes to making the hardware compact, and invites no deterioration in reliability owing to an increase in the number of components.

As so far explained, the radio paging system according to the present invention, enables the recipient to take out a message, by the use of an existing telephone line. The message from the calling subscriber is stored at the paging terminal. The invention keeps its equipment and operating costs remarkably low. Moreover, it is possible to directly send the paging number, in a tone form, from the memory section of the paging receiver to the paging terminal where it is applied to the memory section of the paging terminal. This prevents accidents, such as the theft of messages. Furthermore, unlike the conventional system, no specified number has to be used for taking out the message. Thus, the trouble of registering the number of mishandlings by the recipient can be minimized, if not fully obviated.

What is claimed is:

1. A radio paging method for calling a paging receiver from a telephone set by way of a paging terminal, said method comprising the steps of:
    (a) sending a paging signal assigned to a paging receiver together with a message, said sending being from a first telephone set to a paging terminal;
    (b) transmitting said paging signal from said paging terminal over a radio frequency to said paging receiver;
    (c) storing said message at said paging terminal;
    (d) receiving, at said paging receiver, said paging signal transmitted by said step (b);
    (e) pre-storing the paging number for said paging receiver in said paging receiver;
    (f) sending tones corresponding to the pre-stored paging number (e), said tones being sent from said paging receiver to said paging terminal by way of a second telephone set; and
    (g) sending said message stored by said step (c) to said second telephone set, in response to said tones of step (f).

2. A radio paging method claimed in claim 1, further comprising the steps of (h) sending from said second telephone set to said paging terminal a connection request signal to enable said paging terminal to connect said first and second telephone sets, and (i) connecting said first and second telephone sets in response to said connection request signal sent by said step (h).

3. A paging receiver for receiving a carrier wave modulated with a paging number signal, said receiver comprising:
    means for receiving a modulated carrier wave and demodulating it into a first paging number signal;
    means for pre-storing a second paging number signal which is assigned to said paging receiver;
    means for comparing said first and second paging number signals and for providing an identity signal if said comparing means finds that they are identical with each other;
    means for generating an oscillating tone signal;
    means for modulating said oscillating tone signal with said second paging number signal; and
    means for generating an audible tone in response to either said identity or said modulated tone signal.

4. A paging receiver for receiving a carrier wave modulated with a preamble signal and a first paging number signal, said receiver comprising:
    means for receiving a modulated carrier wave and demodulating it into a preamble signal and a first call number signal;
    means for pre-storing a second paging number signal assigned to said paging receiver;
    first detecting means coupled to the output of said demodulating means for detecting said preamble signal and providing a first read-out signal;
    means responsive to said first read-out signal for reading out said second paging number signal from said storing means;
    second detecting means for comparing said first paging number signal provided from said demodulating means and said second paging call number signal provided from said pre-storing means and for providing an identity signal if said second detecting means finds that they are identical with each other;
    means for generating an oscillating tone signal;
    means for modulating said oscillating tone signal with one of said identity signal and said second paging number signal; and
    means responsive to the output of said modulating means for generating an audible tone.

5. The paging receiver claimed in claim 4, wherein said modulating means comprises switching means for selectively providing one of said identity signal and said second paging number signal to said modulating means; means for inhibiting said first read-out signal to prevent it from reaching said reading-out means and for applying a second read-out to said reading-out means, said reading-out means responding to one of either said first or said second read-out signal for reading out said second call number signal from said pre-storing means; and means for inhibiting said second paging number signal to prevent it from reaching said second detecting means and for applying said second paging number signal to said modulating means.

6. A radio paging system including a paging terminal and a plurality of paging receivers, said paging terminal comprising means for receiving a paging signal and a message which are sent from a first telephone set incorporated in a telephone network, first storing means for storing said message, means for transmitting said paging signal to said plurality of paging receivers, tone receiving means for receiving a first tone signal sent from a second telephone set incorporated in said telephone network, and means responsive to the output of said tone receiving means for sending said message stored in said first storing means to said second telephone set; each of said plurality of paging receivers comprising means for detecting said paging signal to generate an identity signal, second storing means for pre-storing a paging number signal assigned to each of said paging receivers, means for reading out said paging number signal from said second storing means, and means for generating a second tone signal in response to said identity signal and for generating said first tone signal in response to said paging number signal read out of said second storing means.

7. A radio paging system comprising a transmitting station and a plurality of receiving stations, memory means in each of said receiving stations for pre-storing an identification number individually associated with that receiving station, means responsive to a first telephone call to said transmitting station for storing a message and for transmitting a signal representing a selected one of said identification numbers in association with the stored message signals, comparison means in each of said receiving stations responsive to the transmitted signal representing the selected identification number for comparing the number with the number pre-stored therein, means responsive to said comparison means at an identified receiving station for giving a humanly-readable signal to indicate the presence of said paging signal, means responsive to a second telephone call to said transmitting station for sending via said second telephone call a message read-out signal from said identified receiving station, said message read-out signal being an audible signal acoustically coupled to a telephone set involved in said second call, and means responsive to said message read-out signal from said identified receiving station for transmitting said stored message from said transmitting station via said second telephone call.

8. The system of claim 7 wherein said identification numbers are stored in a programmable read only memory in said receiving station.

9. The system of claim 7 or 8 wherein said audible signal is a tone which is modulated with the identification number of said identified receiving station.

10. The system of claim 9 wherein said audible signal modulated with said identification number is transmitted repeatedly.

* * * * *